United States Patent
Manka et al.

(10) Patent No.: US 7,026,378 B2
(45) Date of Patent: Apr. 11, 2006

(54) HYDROCARBYL-SUBSTITUTED PHENOLS IN RESINS FOR CELLULOSIC COMPOSITES

(75) Inventors: John S. Manka, Chardon, OH (US); Todd K. Yonker, Chagrin Falls, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 53 days.

(21) Appl. No.: 10/473,686

(22) PCT Filed: Mar. 12, 2002

(86) PCT No.: PCT/US02/07567

§ 371 (c)(1), (2), (4) Date: Sep. 19, 2003

(87) PCT Pub. No.: WO02/081569

PCT Pub. Date: Oct. 17, 2002

(65) Prior Publication Data

US 2004/0097617 A1    May 20, 2004

Related U.S. Application Data

(60) Provisional application No. 60/281,358, filed on Apr. 4, 2001.

(51) Int. Cl.
C08L 97/02    (2006.01)
C08L 91/06    (2006.01)
C08L 1/00    (2006.01)

(52) U.S. Cl. .................... 524/14; 524/524; 524/487
(58) Field of Classification Search ............ 524/13–14, 524/323, 487; 525/480; 528/137, 155
See application file for complete search history.

(56) References Cited

U.S. PATENT DOCUMENTS

| | | | |
|---|---|---|---|
| 2,805,209 A | 9/1957 | Bowen et al. | 524/13 |
| 3,410,813 A | 11/1968 | Campbell et al. | 524/9 |
| 3,637,429 A * | 1/1972 | Anderson et al. | 428/220 |
| 3,931,070 A | 1/1976 | Bond et al. | 524/17 |
| 4,053,428 A | 10/1977 | Pindar et al. | 252/52 |
| 4,216,179 A | 8/1980 | Lamberts et al. | 264/25 |
| 4,293,509 A | 10/1981 | Bücking | 264/26 |
| 4,361,612 A | 11/1982 | Shaner et al. | 428/106 |
| 4,420,357 A | 12/1983 | Neubauer et al. | 156/274.6 |
| 4,973,764 A | 11/1990 | Oswald et al. | 568/649 |
| 5,342,880 A | 8/1994 | Chappelie | 524/596 |
| 5,451,657 A | 9/1995 | Chappelie | 524/488 |
| 5,506,026 A | 4/1996 | Iwata et al. | 428/107 |
| 5,525,394 A | 6/1996 | Clarke et al. | 428/105 |
| 5,647,934 A | 7/1997 | Vaders et al. | 156/219 |

FOREIGN PATENT DOCUMENTS

| | | | |
|---|---|---|---|
| CH | 335084 | * | 4/1958 |
| CH | 335084 | | 12/1958 |
| JP | 56-166254 | * | 12/1981 |

OTHER PUBLICATIONS

Webster II New College Dictionary, p. 230, Houghton Mifflin Company, 1995.*
Search Report from corresponding PCT International Publication No. WO 02/081569 A1 published Oct. 17, 2002.

* cited by examiner

*Primary Examiner*—Peter Szekely
(74) *Attorney, Agent, or Firm*—Samuel B. Laferty; Michael F. Esposito

(57) ABSTRACT

Waxy hydrocarbyl substituted phenols or phenates are reacted into phenol formaldehyde resins to impart a waxy water resistant nature to binders. A preferred use of the modified phenol formaldehyde resins is as a binder in engineered wood products such as strand board, particle board, medium density fiberboard, plywood and I-beams. Binding the waxy material into the resin may provide a better dispersion of the waxy moieties and prevent migration as has been seen by the simple addition of waxy materials.

7 Claims, No Drawings

HYDROCARBYL-SUBSTITUTED PHENOLS IN RESINS FOR CELLULOSIC COMPOSITES

This application claims the benefit of 60/281,358, filed Apr. 4, 2001.

FIELD OF INVENTION

Hydrocarbyl substituted phenols and/or phenates are added to binder resins for cellulosic composites such as oriented strand board, particle board, medium density fiberboard and plywood to increase the water resistance of these material. Often these binder resins are phenol-formaldehyde resins or modified phenol-formaldehyde resins, so the hydrocarbyl substituted phenol can be reacted into the resin and not be a migratory additive to the composite.

BACKGROUND OF THE INVENTION

Resin bound cellulosic composites such as oriented strand board, particle board, chip board, and plywood are commonly used construction materials and are well known to the art. Resin binders for engineered composites are also well known and include phenol-formaldehyde resins, isocyanate resins, melamine formaldehyde resins, urea formaldehyde resins, and blends containing reactants from one or more of the above reactive resins. The particular resin depends upon the particular manufacturing process used to form the composite, the desired viscosity of the binder, the reaction conditions under which the resin binder is to cure, and the amount of moisture that may be in the cellulosic material used. Many of these composites are exposed to moisture during storage, use, and/or during construction so it is desirable that the moisture not change the shape, appearance, or structural integrity of the composite.

Many of these resin binders include small amounts of wax to make the resin binder, along with the entire composite, more hydrophobic (moisture repellant). The wax additives tend to spread on the surface of the composites and give improved water resistance. However the wax can be migratory which leads to problems with the hydrophobic surface nature of the composite being lost or reduced. It is also possible for the wax to be ineffectively dispersed which can result in unacceptably low hydrophobicity and/or lesser physical strength and integrity in the composite.

SUMMARY OF INVENTION

Hydrocarbyl substituted phenols and/or phenates can impart hydrophobicity to various binder resins. These substituted phenols and/or phenates can be better dispersed in resin binders due to the phenol or phenate portion of the molecule which can react into or associate with phenol-formaldehyde resins. The substituted phenol and/or phenates can also react into other resin binder systems. The substituted phenols and/or phenates can also act as a dispersant for any added wax, making any added wax more efficient in providing hydrophobicity on a weight basis. The hydrocarbyl groups desirably have from about 4 to about 700 carbon atoms. They can generally be subdivided into linear or branched alkyls or alkenyls of 4 to 40 carbon atoms or polymers from isobutylene or alpha olefin monomers such as polypropylene of number average molecular weight from about 300 to about 10,000. The substituted phenol(s) and/or phenate(s) can be coupled with themselves or with non-substituted phenol and/or phenate to form oligomers or polymers with multiple hydrocarbyl substituted phenol(s) and/or phenate(s) therein. A particularly preferred embodiment involves making the substituted phenol and/or phenate more compatible with the resin by pre-reacting it with phenol and formaldehyde to form a phenol-formaldehyde resin and/or pre-reacting the substituted phenol and/or phenate with a portion of the resin binder to make the hydrocarbyl substituted phenol and/or phenate compatible with the resin binder.

DETAILED DESCRIPTION OF THE INVENTION

A first embodiment is the creation of a wax modified binder resin using a waxy hydrocarbyl substituted phenol and/or phenate or a derivative thereof. This modified resin binder can then be used in a second embodiment, which is a cellulosic composite adhered together with the modified resin binder. A preferred resin binder to be modified is a phenol-formaldehyde resin binder.

A modified resin binder comprises a resin binder and from 1 to about 30 or 50 parts by weight of various waxy hydrocarbyl functionalized phenols and/or metal phenates (or a derivative thereof containing 1 to about 30 or 50 parts by weight of said phenol or phenate) based on 100 parts by weight of said resin binder. For the purpose of this application it will be considered that the 100 parts by weight of said resin binder includes the various hydrocarbyl functionalized phenols or phenates since it is anticipated that a substantial portion of these compounds will be incorporated into (and reacted into) a binder resin. A preferred binder resin is a phenol-formaldehyde binder resin. More desirably the amount of the various hydrocarbyl functionalized phenols and/or metal phenates are from about 1 or 2 to about 20 or 30, and preferably from about 3 to about 15. The term "waxy" is inserted before hydrocarbyl to exclude some of the highly crystalline hydrocarbyl groups that would not function as waxes do providing lubricity and hydrophobicity. An example of a non-waxy hydrocarbyl would be a polyethylene having at least 20 weight percent crystallinity or more broadly having at least 10 weight percent crystallinity.

Preferred waxy hydrocarbyl groups for specific embodiments include alkyls or alkenyls of 4 or 5 to about 700 carbons atoms. These can be subdivided into alkyls or alkenyls of 12 to about 80 carbon atoms and preferably from about 20 to about 40 carbon atoms, these may be linear or branched with linear being slightly preferred. Obviously these alkyl or alkenyl groups can be blended falling within the specified ranges of carbon atoms. A second group of alkyls or alkenyls is polyisobutylene and other alpha olefin polymer groups of number average molecular weights from about 300 to about 10,000; more desirably from about 400 to about 3,000 and preferably from about 400 to about 1800. Preferred alpha olefin polymers are those having 50% or more of repeating units from propylene or isobutylene. The hydrocarbyl functionalized phenates are an alternate embodiment to the hydrocarbyl functionalized phenols where the labile hydrogen of the OH group is temporarily replaced by a metal ion (M). As these phenols and phenates can be readily chemically converted to each other the ability to substitute one for the other in this invention is clear.

As used herein, the term "hydrocarbyl", "hydrocarbyl substituent" or "hydrocarbyl group" is used in its ordinary sense, which is well known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule;

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The term "hydrocarbyl" is also intended to include hydrocarbylene, that is, groups having bonds to non-hydrocarbon functionality at two places, i.e., two open valences.

The hydrocarbyl substituted phenols or phenates need not be limited to a single phenol or phenate group but may be several phenols or phenates coupled with various coupling agents to form oligomers or polymers with from 2 to 50 or 100 hydrocarbyl substituted phenols or hydrocarbyl substituted phenate units therein. Common coupling agents include a coupling linkage derived from the reaction of phenol or phenates with formaldehyde and other aldehydes, or the reaction product of phenol and/or phenates with sulfur (i.e. Sx where x is typically from 1 to 8 (S1–S8). The bonds between phenols (and/or phenates) when using formaldehyde as the other reactant can be methylene linkages or dibenzyl ether linkages.

The hydrocarbyl substituted phenols and or phenates can be added as the substituted phenol reaction product with formaldehyde (various forms of mono and di methylolphenol) or blends of methylene or dibenzyl ether coupled phenols and substituted methylol phenol. The methylol group(s) generally add in the ortho position(s) to the hydroxyl group of the phenol but may also add in the para position if it is not occupied by a hydrocarbyl group. Alternatively the hydrocarbyl substituted phenols and/or phenates can be added as the various reaction products of sulfur and the phenols and/or phenates.

Alternatively to mono or di methylol substituted hydrocarbyl phenols and/or phenates, one can use the reaction product of glyoxal and a hydrocarbyl substituted phenol. The glyoxal in this reaction product is converted to a —CH(OH)—C(O)OH group(s) on the phenol or phenate. These groups would typically be in the ortho position but might be in a para position relative to the OH of the phenol. The C(OH) group of the phenol can react with the —C(O)OH group of the —CH(OH)—C(O)OH to form a —CO—C(O)— linkage and a molecule of water. This reaction is reversable.

Generally the waxy hydrocarbyl groups will be substituted in the para position with respect to the hydroxyl group of the phenol or the OM group of the phenate. In some embodiments the waxy hydrocarbyl group can be in one of the ortho positions of the phenol or phenate leaving an additional free ortho position and/or a para position for condensation with formaldehyde or with reaction products of phenol (and/or phenate) with formaldehyde. There can be 1 or more hydrocarbyl groups substituted onto the phenol. Generally it is desirable that at least one ortho or para position on the phenol remain unsubstituted so that the hydrocarbyl substituted phenol and/or phenate can be incorporated into a phenol-formaldehyde resin or other binder resin.

The hydrocarbyl substituted phenol and/or phenate can have the following structures where R is the hydrocarbyl groups described above and M is H or a cation of sodium, potassium or other equivalent cation.

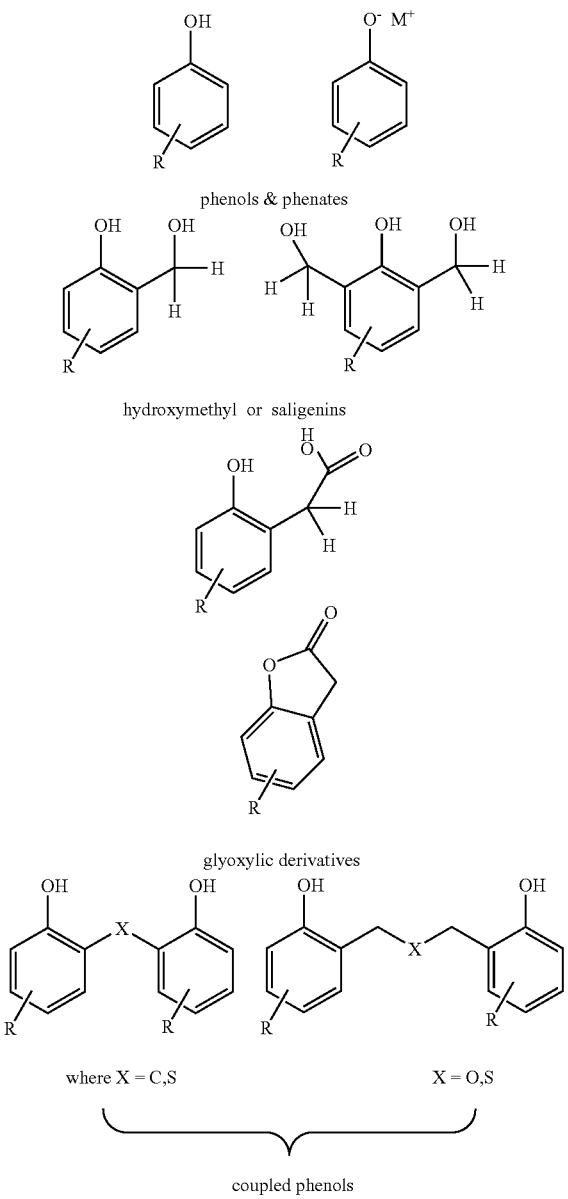

In this invention, it is anticipated that the hydrocarbyl groups of the hydrocarbyl substituted phenol and/or phenate will generally have lower surface tension than the resin and therefore the hydrocarbyl groups will want to preferentially migrate to the surfaces of the resin binder where they can provide some additional water resistance or hydrophobicity to both the resin binder and the composite of cellulosic material and the resin binder. While all of the larger hydrocarbyl groups may want to migrate to a surface, some may be physically restricted by the phenol formaldehyde fragment that they are incorporated into. The hydrocarbyl substituted phenol and/or phenate may be too far from a surface to effectively migrate. The term preferentially is used to indicate that this is a preference and not a requirement. While the hydrophobic/ hydrophilic balance of part of the binder resin will be modified by the hydrocarbyl group(s) a substantial portion (by weight) of the binder resin will not be modified and will retain a fairly polar nature which should preserve the excellent binding capabilities of the resin to the fairly polar surfaces of cellulosic materials.

No attempt will be made in this application to define all of the reaction conditions used to prepare phenol formaldehyde resins or even resins which may contain phenol as one reactant. Phenol formaldehyde resins are described in basic polymer textbooks such as Principles of Polymerization, 2nd edition by George Odian, published in 1981 by John Wiley & Sons Inc. as a Wiley-Interscience publication. Pages 128–133 of Odian's book give general teachings on catalyzed phenol formaldehyde reaction products. Pages 139–140 gives general teachings on phenol formaldehyde reaction products called structopendant phenol-formaldehyde prepolymers or nonovolacs. Sometimes phenol formaldehyde resins are called resol prepolymers or resoles. Another name for a group of phenol formaldehyde resins is resorcinol resins. Phenol formaldehyde resins are also described in Textbook of Polymer Science, 3rd edition, by Fred W. Billmeyer, Jr. and published by John Wile & Sons as a Wiley-Interscience publication on pages 436–440. The relevant sections of both books are hereby incorporated by reference.

A preferred use of a binder resin modified with the waxy hydrocarbyl substituted phenol and/or phenate is in engineered wood products. Essential components of engineered wood products using the modified binder resins are a cellulosic material in a large amount and a smaller amount, effective to bind the cellulosic material into an adherent mass of a resin binder, such as phenol-formaldehyde.

Desirably the cellulosic material is some form of wood such as wood veneers, wood chips, wood particles, and wood fibers (also known as ligno cellulosics). These materials along with a resin binder are used to form a variety of structural materials such as plywood, chipboard, wafer board, particle board, medium density fiberboard, oriented strand board (OSB), laminated veneer lumber (LVL) other wood composite boards, etc that are used in construction and various other applications. Important criteria for these materials include modulus (rigidity); resistance to cracking, resistance to edge swell, moisture, water, and change in properties on aging; and compatibility and effective interaction with other construction materials such as nails, screws, adhesives etc. Desirably these products have at least 80 weight percent of cellulosic materials (ligno cellulosics) therein (such as a natural wood product) and at least 1 or 2 weight percent of a synthetic resin binder, and up to 18 or 19 weight percent of other materials such as waxes, fillers, waterproofing agents, resin hardeners or catalysts, colorants, etc. More desirably these products have at least 90 weight percent of cellulosic materials, about 1 or 2 to about 10 weight percent of a resin binder, and up to 8 or 9 weight percent of the other additives. Preferably these products have at least 95 weight percent of cellulosic materials, about 1 or 2 to about 5 weight percent of a resin binder, and up to 3 or 4 weight percent of said other additives.

In the past in cellulosic composites where water resistance was desired, wax might be added to make part of the surfaces fairly hydrophobic and increase resistance to water absorption and swelling. Two commonly used waxes were slack wax and wax emulsions. Most waxes are fairly incompatible with resin binders and tended to phase separate from the resin binder in relatively large domains that are not as effective in providing hydrophobicity as smaller domains would be. The larger domains may also compromise the physical strength or integrity of the composite. It is anticipated that the hydrocarbyl groups of the hydrocarbyl substituted phenols and/or phenates will help to better disperse any wax added to the composition, due to the compatibility of the wax with the hydrocarbyl groups, thereby dispersing the wax in smaller domains and making the wax more effective as a hydrophobe on a weight basis. Hopefully the better dispersion will also reduce any negative effect of the wax on the physical integrity of the cellulose composite by reducing the average size of the dispersed wax phase.

While some of the hydrocarbyl substituted phenols and/or phenates with small hydrocarbyl groups (e.g. with less than 10 carbon atoms) may be soluble in the resin binder for the cellulosic materials (depending significantly on the structure and composition of the resin binder and any solvents present), the phenols and/or phenates with larger hydrocarbyl groups may need to be made compatible with the resin binder for optimal properties.

This might be achieved by heating the resin binder, adding an agent which is compatible with both the hydrocarbyl substituted phenol and/or phenate, or by chemically bonding the hydrocarbyl substituted phenol an/or phenate onto the resin binder or another material compatible with the resin binder (e.g. smaller fragments of phenol-formaldehyde condensation products). An example of this is where one would react and hydrocarbyl substituted phenol with phenol and formaldehyde under conditions conducive to form a phenol-formaldehyde resin. While the hydrocarbyl substituted phenol and/or phenate may be too oleophilic to be completely compatible with the resin binder, by adding some phenol-formaldehyde resin onto the hydrocarbyl substituted phenol and/or phenate compatibility is improved. Another option is to partially condense the hydrocarbyl substituted phenol and/or phenate with the all or a part of the resin binder under conditions where chemical reactions binding the hydrocarbyl substituted phenol and/or phenate to the resin would occur.

The engineered wood products can be a variety of man made composites that compete against structural lumber. Resin binders hold cellulosic materials (fibers and their natural resin binders) together to make larger structural wood products. These include oriented strand board (OSB) which appears as chips of wood having at least one dimension greater than 1 cm held together with a commercial binder. Another product is particle board, which is similar to OSB but using smaller fiber lengths and the particle board typically has lesser strength. Medium density fiberboard is a denser version of particle board designed to have more strength. Plywood is a composite of wood veneers and wood chips or particles laminated together with a resin binder. Plywood often has a particular soft or hardwood veneer on at least one side that can be stained or otherwise finished to provide an attractive exposed surface. All of the above wood products can be used in applications where strength and stiffness are required such as roofs, floors, walls, etc. This may be called sheathing or underlayment in these applications. They may be made fire retardant or moisture resistant for these applications.

The engineered wood product may also be a laminate of smaller wood pieces assembled together with a resin binder to make a larger piece of wood or a structurally superior (engineered) wood shape. A common name for wood products made by lamination of multiple wood pieces is laminated veneer lumber (LVL). A common designed or engineered shape is a wood I-beam or joist prepared from OSB and LVL. These typically comprise two long (e.g. rectangular in cross-section) LVLs held together with an intervening web of thinner OSB. These types of engineered shapes take advantage of the lower volume and weight of the web and the high compressive and tensile strength of the LVL.

Wood composites such as oriented strand board, particle board, and plywood are assembled with a variety of techniques. The resin binders may be added as powders, liquids, binders in water, or binders in other solvents. The wood composites may be pre-shaped by laying out desired volumes or weights of materials in specific order and then compression and shaping. The manufacturing processes can be batch, continuous or variations thereof. They can be wet or dry processes. The processes may use other binders such as urea formaldehyde, melamine formaldehyde, epoxy systems, or urethane systems. If the resin binder is to be crosslinked, that can be achieved with heat, catalysts, and various radiations such as R.F. or microwaves. Formaldehyde scavengers may be added to the composites to minimize the release of free formaldehyde during manufacture or use. The resin binders (adhesive) may be applied by spray, curtain coater, roll spreader, foam application equipment or simpler mixing techniques.

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

What is claimed is:

1. A cellulosic composite comprising;
   a) at least 80 weight percent of a ligno cellulosic material
   b) from about 1 to about 19 weight percent of a resin binder, wherein said resin binder includes a modified phenol-formaldehyde resin and including from about 1 to about 50 parts by weight of a hydrocarbyl substituted phenol or hydrocarbyl substituted phenate, wherein said hydrocarbyl group is a linear or branched alkyl or alkenyl of 12 to 80 carbon atoms either dispersed in said phenol formaldehyde resin or chemically reacted into said phenol-formaldehyde resin,
   c) at least one part by weight of a wax material, wherein said parts by weight of hydrocarbyl substituted phenol or phenate are based upon the weight of said phenol-formaldehyde resin and said hydrocarbyl substituted phenol and phenate present in said phenol-formaldehyde resin and wherein said cellulosic material and resin binder is in the form of a particle board, chipboard, oriented strand board, medium density fiberboard, plywood, or paneling.

2. A cellulosic composite according to claim 1, wherein said hydrocarbyl substituted phenol or phenate is present in an amount from about 2 to about 20 parts by weight per one hundred parts by weight of said phenol formaldehyde resin and said hydrocarbyl group has from 20 to 40 carbon atoms.

3. A cellulosic composite according to claim 1, wherein said ligno cellulosic material is present in an amount of at least 90 weight percent of said composite and said resin binder is present in an amount from about 1 to about 10 weight percent.

4. A cellulosic composite according to claim 1 wherein said ligno cellulosic material is present in amount of at least 95 weight percent and said resin binder is present in an amount from about 1 to about 5 weight percent.

5. A cellulosic composite according to claim 1, wherein said hydrocarbyl substituted phenol or phenate is present in said composite is present as coupled products or oligomers in said resin binder.

6. A cellulosic composite according to claim 1, wherein said hydrocarbyl substituted phenol or phenate is present in said composite co-reacted into said resin binder.

7. In a process for making a cellulosic composite in the form of a particle board, chipboard, oriented strand board, medium density fiberboard, plywood, or paneling from at least 90 weight percent of a ligno cellulosic material in chip, strand or particle form by compressing said cellulosic material together with less than 10 weight percent of a resin binder forming a coherent mass, the improvement comprising adding from about 1 to about 50 parts by weight of a hydrocarbyl substituted phenol or hydrocarbyl substituted phenate in a dispersible form and at least one part by weight of a wax material to said resin binder to impart some hydrophobicity to said resin binder wherein said hydrocarbyl group is a linear or branched alkyl or alkenyl of 12 to 80 carbon atoms.

* * * * *